US009983706B2

(12) United States Patent
Liao et al.

(10) Patent No.: US 9,983,706 B2
(45) Date of Patent: May 29, 2018

(54) MANUFACTURING METHOD OF TOUCH PANEL

(71) Applicant: HannsTouch Solution Incorporated, Tainan (TW)

(72) Inventors: Sian-Zong Liao, Taichung (TW); Yao-Chih Chuang, Tainan (TW); Han-Ming Chen, Tainan (TW); Jia-Ming Ye, Taichung (TW)

(73) Assignee: HannsTouch Solution Incorporated, Tainan (TW)

( * ) Notice: Subject to any disclaimer, the term of this patent is extended or adjusted under 35 U.S.C. 154(b) by 141 days.

(21) Appl. No.: 15/052,886

(22) Filed: Feb. 25, 2016

(65) Prior Publication Data
US 2016/0170515 A1 Jun. 16, 2016

Related U.S. Application Data

(63) Continuation of application No. 13/831,986, filed on Mar. 15, 2013.

(30) Foreign Application Priority Data

Nov. 30, 2012 (TW) .............................. 101144955 A

(51) Int. Cl.
G06F 3/041 (2006.01)
G06F 3/044 (2006.01)

(52) U.S. Cl.
CPC .............. G06F 3/041 (2013.01); G06F 3/044 (2013.01); G06F 2203/04103 (2013.01); G06F 2203/04111 (2013.01)

(58) Field of Classification Search
CPC .................... G06F 3/041; G06F 3/044; G06F 2203/04103; G06F 2203/04111
USPC ......................................................... 345/173
See application file for complete search history.

(56) References Cited

U.S. PATENT DOCUMENTS

| 9,229,555 | B2 * | 1/2016 | Kim ........................ G06F 3/044 |
| 2009/0280606 | A1 * | 11/2009 | Shih .................. H01L 27/14692 438/155 |
| 2009/0315854 | A1 * | 12/2009 | Matsuo ................. G06F 3/0412 345/174 |
| 2010/0245285 | A1 * | 9/2010 | Wang ...................... G06F 3/044 345/174 |
| 2011/0035938 | A1 * | 2/2011 | Kweon .................. H05K 1/162 29/830 |
| 2013/0033446 | A1 * | 2/2013 | Liu .......................... G06F 3/044 345/173 |
| 2013/0057497 | A1 * | 3/2013 | Cho ........................ G06F 3/044 345/173 |

(Continued)

FOREIGN PATENT DOCUMENTS

KR 1020110005611 * 7/2012

Primary Examiner — Benyam Ketema
(74) Attorney, Agent, or Firm — Winston Hsu

(57) ABSTRACT

The present invention provides a touch panel including a substrate, a patterned transparent conductive layer, and a color compensation layer. The patterned transparent conductive layer is disposed on the substrate, and includes a plurality of first sensing pads and a plurality of second sensing pads, and each first sensing pad and each sensing pad adjacent thereto have a first gap between them that exposing the substrate. The color compensation layer is disposed on the substrate in the first gap, and is not in contact with the patterned transparent conductive layer.

12 Claims, 7 Drawing Sheets

(56) References Cited

U.S. PATENT DOCUMENTS

2013/0201116 A1* 8/2013 Huang .................. G06F 3/044
345/173
2014/0022467 A1* 1/2014 Chai ................... G02F 1/13338
349/12

* cited by examiner

MANUFACTURING METHOD OF TOUCH PANEL

CROSS REFERENCE TO RELATED APPLICATIONS

This application is a continuation of U.S. application Ser. No. 13/831,986, filed Mar. 15, 2013, which is incorporated herein by reference in its entirety.

BACKGROUND OF THE INVENTION

1. Field of the Invention

The present invention relates to a touch panel and a manufacturing method thereof, and more particularly, to a touch panel with color compensation layer placed between sensing pads and a manufacturing method thereof.

2. Description of the Prior Art

Having the advantage of man-machine interactive characteristics, touch panels have been widely used in input interface of various instruments. As the application of consumer electronic products progressed rapidly in recent years, the integration of touch screen functionality and displays into touch panels have increased significantly, including products such as mobile phones, GPS navigation systems, tablet PCs, PDAs, and laptop PCs.

Conventional touch panel typically includes a glass substrate, a patterned transparent conductive layer, a plurality of bridge electrode layers, and a passivation layer. The patterned transparent conductive layer includes a plurality of first sensing stripes and a plurality of sensing pads, in which the first sensing stripes are extended along a first direction. Each bridge electrode electrically connects two adjacent sensing pads to each other to form a plurality of second sensing stripes, in which the second sensing stripes are extended along a second direction perpendicular to the first direction so that the first sensing stripes and the second sensing stripes preferably cross each other. The passivation layer is disposed on the patterned transparent conductive layer and a portion of the glass substrate is exposed by the patterned transparent conductive layer.

However, the patterned transparent conductive layer does not cover the surface of the glass substrate entirely, and as the light color obtained after the light passes through the patterned transparent conductive layer is essentially different from the light color obtained after the light passes through the passivation layer on the glass substrate exposed by the patterned transparent conductive layer, the patterned transparent conductive layer is easily recognized as the light passes through the touch panel thereby causing poor visual performance. Moreover, image displayed by the touch panel is also easily interfered by the patterned transparent conductive layer and the clarity of the image is compromised significantly.

Hence, how to effectively lower the visual influence of patterned transparent conductive layer has become an important task in the field.

SUMMARY OF THE INVENTION

It is therefore an objective of the present invention to provide a touch panel and a manufacturing method thereof for reducing the effect caused by the patterned transparent conductive layer visually.

According to a preferred embodiment of the present invention, a touch panel is disclosed. The touch panel includes a substrate, a patterned transparent conductive layer, and a color compensation layer. The patterned transparent conductive layer including a plurality of first sensing pads and a plurality of second sensing pads is disposed on the substrate, in which each of the first sensing pads and each of the second sensing pads adjacent thereto have a first gap therebetween to expose the substrate. The color compensation layer is disposed on the substrate and in the first gap and not in contact with the patterned transparent conductive layer.

According to another aspect of the present invention, a touch panel is disclosed. The touch panel includes a substrate, a patterned transparent conductive layer, and a color compensation layer. The patterned transparent conductive layer including a plurality of first sensing pads and a plurality of second sensing pads is disposed on the substrate, in which each of the first sensing pads and each of the second sensing pads adjacent thereto have a first gap therebetween to expose the substrate and the patterned transparent conductive layer has a first thickness. The color compensation layer is disposed on the substrate and in the first gap and contacting the patterned transparent conductive layer, in which the color compensation layer has a second thickness less than or equal to the first thickness.

According to another aspect of the present invention, a method for fabricating touch panel is disclosed. First, a substrate is provided and a transparent conductive layer is formed on the substrate. Next, a patterned photoresist is formed on the transparent conductive layer, in which the patterned photoresist includes an opening for exposing the transparent conductive layer. The transparent conductive layer is then etched through the opening to form a patterned transparent conductive layer, in which the patterned transparent conductive layer includes a plurality of first sensing pads and a plurality of second sensing pads, and each of the first sensing pads and each of the second sensing pads adjacent thereto have a first gap therebetween and the width of the first gap is larger than the width of the opening. Next, a color compensation layer is covered on the patterned photoresist and the exposed substrate, and a lift off process is carried out to remove the patterned photoresist and the color compensation layer on the patterned photoresist.

By disposing a color compensation layer between each of the first sensing pads and the second sensing pads while the third color of the color compensation layer is between the first color of the substrate and the second color of the patterned transparent conductive layer, the color of the light obtained after passing through the substrate and the color compensation layer could be substantially the same as the color obtained after passing through the substrate and the patterned transparent conductive layer, thereby compensating the light color passed through each of the first sensing pads and the second sensing pads. By doing so, viewers would not notice the pattern of the patterned transparent conductive layer thereby reducing the visual effect of the patterned transparent conductive layer to a minimal. Also, by forming the color compensation layer between each of the first sensing pads and the second sensing pads through lift off process not only controls the position of the color compensation layer precisely but also reduces the cost substantially.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
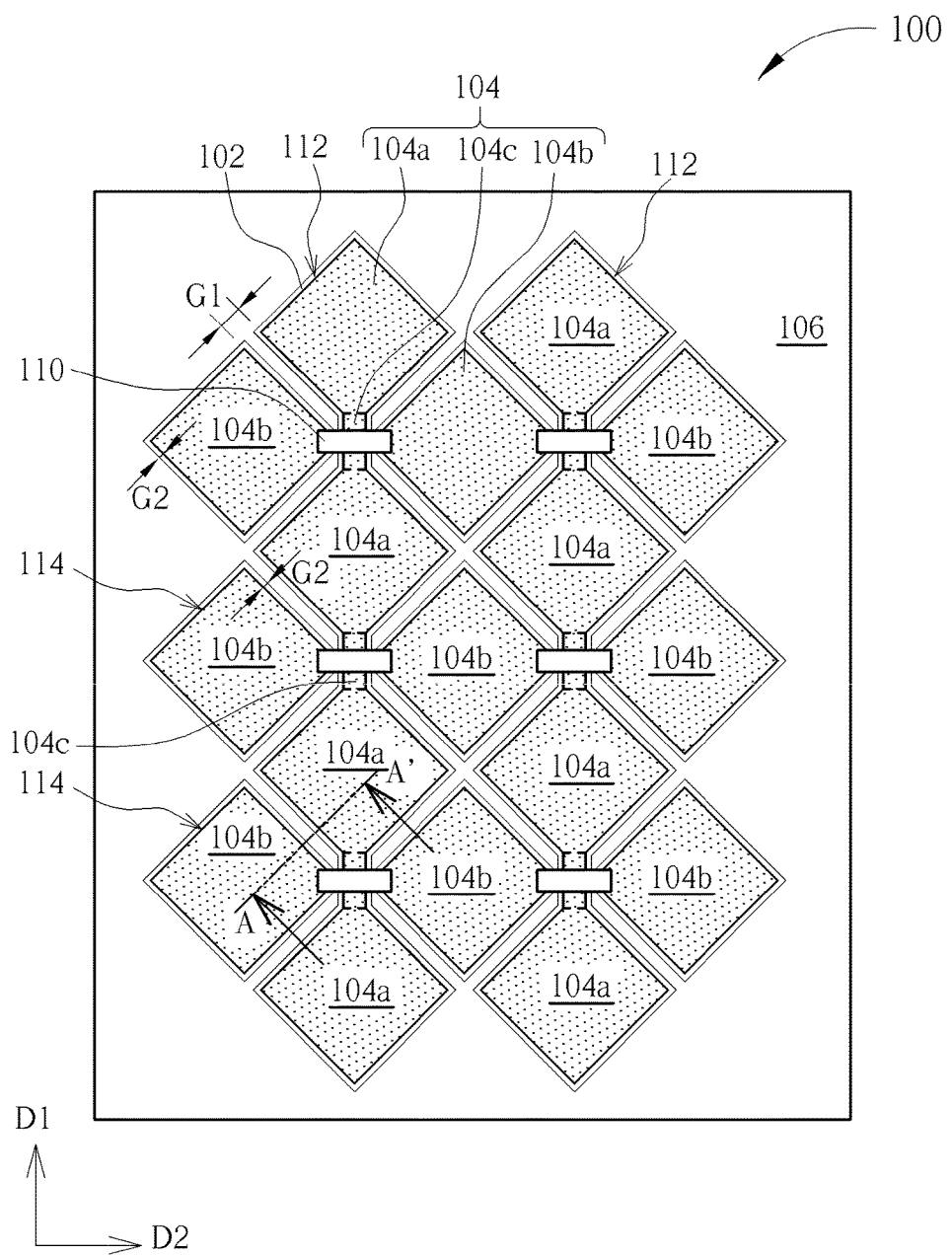
FIG. 1 illustrates a top view of a touch panel according to a first embodiment of the present invention.
Figure 2:
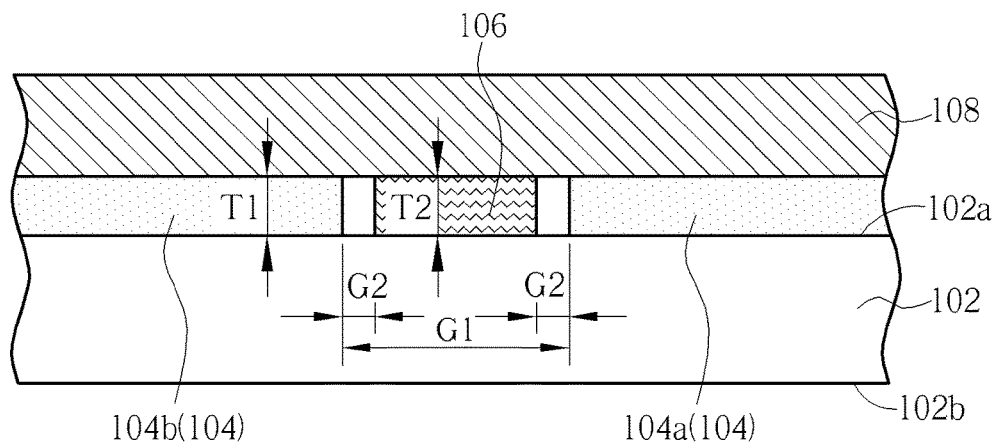
FIG. 2 illustrates a cross-sectional view of FIG. 1 along the sectional line A-A'.

Referring to FIGS. 1-2, FIG. 1 illustrates a top view of a touch panel according to a first embodiment of the present invention, and FIG. 2 illustrates a cross-sectional view of FIG. 1 along the sectional line A-A'. As shown in FIGS. 1-2, a touch panel 100 includes a substrate 102, a patterned transparent conductive layer 104, a color compensation layer 106, a passivation layer 108, and a plurality of bridge electrodes 110. The substrate 102 has a first surface 102a and a second surface 102b relative to the first surface 102a, in which the substrate 102 could be a transparent substrate, such as a glass substrate, a plastic substrate, or a quartz substrate. The patterned transparent conductive layer 104 and the color compensation layer 106 are disposed on the first surface 102a of the substrate 102, in which the patterned transparent conductive layer 104 has a first thickness T1 and the color compensation layer 106 has a second thickness T2. The passivation layer 108 is disposed on the patterned transparent conductive layer 104 and the color compensation layer 106, in which the passivation layer 108 could be composed of transparent insulating material including silicon oxide, silicon nitride, and silicon oxynitride. In this embodiment, the patterned transparent conductive layer 104 includes a plurality of first sensing pads 104a, a plurality of second sensing pads 104b, and a plurality of connecting parts 104c composed of a first transparent conductive material such as indium tin oxide (ITO) or indium zinc oxide (IZO). The connecting parts 104c preferably connect the adjacent first sensing pads 104a arranged along a first direction D1 so that the first sensing pads 104a and the connecting parts 104c connected thereto could form a first sensing stripe 112. The first sensing pads 104a and the connecting parts 104c could form a plurality of first sensing stripes 112, and the first sensing stripes 112 are arranged sequentially along a second direction D2 perpendicular to the first direction D1 such that the first sensing stripes 112 could be used to detect objects of the touch panel 100 on the second direction D2. The bridge electrodes 110 are disposed horizontally on top of the connecting parts 104c while being electrically insulated from the connecting parts 104c. For instance, the touch panel 100 could further include an insulating layer disposed between the bridge electrodes 110 and the connecting parts 104c. The bridge electrodes 110 are further connected to the adjacent second sensing pads 104b arranged along the second direction D2 so that the second sensing pads 104b and the bridge electrodes 110 could form a second sensing stripe 114. By doing so, the second sensing pads 104b and the bridge electrodes 110 could be used to form a plurality of second sensing stripes 114. The second sensing stripes 114 are arranged sequentially along the first direction D1 such that the second sensing stripes 114 could be used to detect objects of the touch panel 100 on the first direction D1. Through the detection of the first sensing stripes 112 and the second sensing stripes 114, the object position of the touch panel could be detected accordingly. Additionally, each of the first sensing pads 104a and each of the second sensing pads 104b adjacent thereto have a first gap G1 therebetween, in which the first gap G1 is preferably not covered by any of the patterned transparent conductive layer 104. In this embodiment, the first gap G1 preferably exposes the first surface 102a of the substrate 102 while the first gap G1 is preferably between 20 μm to 30 μm, but not limited thereto. In other embodiments of the present invention, the first sensing stripes could be aligned not perpendicular to the second sensing stripes, but instead be arranged with the second sensing stripes at an angle less than 90 degree. In addition to the arrangements described above, the first sensing stripes and second sensing stripes could also be arranged according to other layouts and shapes, and not limited thereto. Moreover, despite the fact that the bridge electrodes 110 are disposed above the connecting parts 104c thereby forming a top bridge architecture, the bridge electrodes 110 could also be disposed under the connecting parts 104c to form a bottom bridge architecture, which is also within the scope of the present invention.

The color compensation layer 106 is disposed on the substrate 102 and within the first gap G1, and also between each of the first sensing pads 104a and the adjacent second sensing pads 104b. Preferably, the substrate 102 has a first color, the transparent conductive layer 104 has a second color, and the color compensation layer 106 has a third color. Each of the first color, the second color, and the third color of the present invention is defined as a color generated by a light beam with particular color, such as a white light which is the CIE 1931 space color coordinates (⅓, ⅓), penetrating through the substrate 102, the transparent conductive layer 104, and the color compensation layer 106 respectively in which the first color, the second color, and the third color could be any coordinates defined by the CIE 1931 color space. In addition, the third color of the color compensation layer 106 could be between the first color and the second color, hence that CIE 1931 color space coordinates represented by the third color are between the CIE 1931 color space coordinates represented by the first color and the CIE 1931 space color coordinates represented by the second color. The third color of the color compensation layer 106 could also be the same as the second color. By doing so, the color obtained by the light beam penetrating through the substrate 102 and the color compensation layer 106 could be substantially the same as the color obtained by the light beam penetrating through the substrate 102 and the patterned transparent conductive layer 104, so that observers would not notice the presence of the pattern of the patterned transparent conductive layer 104.

In this embodiment, the color compensation layer 106 is not in contact with the patterned transparent conductive layer 104, and the color compensation layer 106 and the patterned transparent conductive layer 104 have a second gap G2 therebetween, in which the gap G2 is between 0.5 μm to 5 μm. As minimal distance identifiable by the human eyes typically is 10 μm, the second gap G2, being less than 10 μm, is not easily identified by human eyes. Hence, by placing a color compensation layer 106 between each of the first sensing pads 104a and each of the second sensing pads 104b and using the color compensation layer 106 to cover majority of the substrate 102 not covered by the patterned transparent conductive layer 104, the lights penetrating through every region of the touch panel 100 would have substantially same color and equal uniformity.

The third color of the color compensation layer 106 is determined by the material used for forming the color compensation layer 106 and the second thickness T2 of the color compensation layer 106, in which the material of the color compensation layer 106 preferably determines the absorption coefficient, index of refraction, and dispersion coefficient of the color compensation layer 106. The second thickness T2 of the color compensation layer 106 could be greater than, equal to, or less than the first thickness T1 of the patterned transparent conductive layer 104, and could also be adjusted according to the material of the color compensation layer 106 so that the third color of the color compensation layer 106 could be the same as the second color of the patterned transparent conductive layer 104 or between the first color of the substrate 102 and the second color of the patterned transparent conductive layer 104. For instance, the color compensation layer 106 and the patterned transparent conductive layer 104 could be composed of same transparent conductive material such as indium tin oxide (ITO) or indium zinc oxide (IZO). The second thickness T2 of the color compensation layer 106 is preferably the same as the first thickness T1 of the patterned transparent conductive layer 104, so that the third color of the color compensation layer 106 becomes the same as the second color of the patterned transparent conductive layer 104. By doing so, the lights passing through each region of the touch panel 100 would have no color difference. It should be noted that the color compensation layer disclosed in the aforementioned embodiment does not necessarily have to be composed of same material as the patterned transparent conductive layer, but could also be composed of a transparent insulating material such as silicon dioxide, silicon nitride, or oxynitride. Moreover, the second thickness of the color compensation layer is also adjusted according to different thickness and different material of the patterned transparent conductive layer.

It should be noted that a color compensation layer 106 is formed to be between each of the first sensing pads 104a and each of the second sensing pads 104b in this embodiment, in which the third color of the color compensation layer 106 could be identical as the second color of the patterned transparent conductive layer 104 or between the first color of the substrate 102 and the second color of the patterned transparent conductive layer 104, so that the color obtained after the light beam penetrating the substrate 102 and the color compensation layer 106 could be substantially the same as the color obtained after the light beam penetrating the substrate 102 and the patterned transparent conductive layer 104. By doing so, the observers would not notice the pattern of the patterned transparent conductive layer 104 thereby preventing interference of the patterned transparent conductive layer 104 to the image of the display panel while improving the visual performance of the touch panel 100.

In addition to the aforementioned embodiments, other variations and embodiments of the present invention are addressed below, and in order to simplify the description of each embodiment and highlight the difference between each embodiment, elements addressed previously are labeled with same reference numbers and the description of the elements addressed in the aforementioned embodiments is not repeated.

Figure 3:
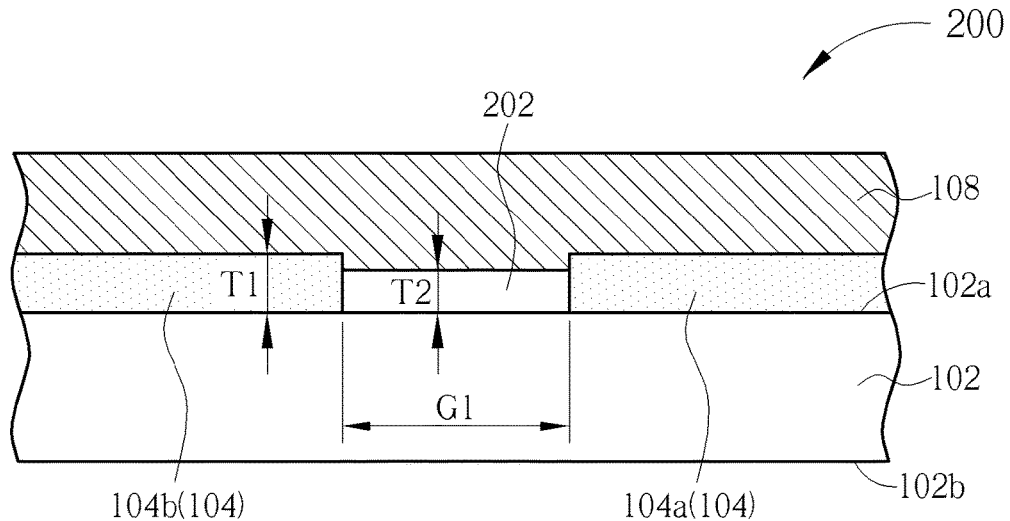
FIG. 3 illustrates a cross-sectional view of a touch panel according to a second embodiment of the present invention.

Referring to FIG. 3, FIG. 3 illustrates a cross-sectional view of a touch panel according to a second embodiment of the present invention. As shown in FIG. 3, as compared with the first embodiment, the color compensation layer 202 of the touch panel 200 is disposed on the first surface 102a of the substrate 102 and within the first gap G1, and contacts the patterned transparent conductive layer 104; that is the color compensation layer 202 contacts each of the first sensing pads 104a and the second sensing pads 104b. The color compensation layer 202 of this embodiment is composed of a transparent insulating material such as silicon dioxide, silicon nitride, or oxynitride, and the second thickness T2 of the color compensation layer 202 is equal to or less than the first thickness T1 of the patterned transparent conductive layer 104 such that the third color of the color compensation layer 202 is equal to the second color of the patterned conductive layer 104 or between the first color of the substrate 102 and the second color of the patterned transparent conductive layer 104. It should be noted that if the photoresist 118 coated on the patterned transparent conductive layer 104 is removed by a lift off process during the manufacturing method, the second thickness T2 of the color compensation layer 106 could be designed to be less than the first thickness T1 of the patterned transparent conductive layer 104 during the formation (or deposition) of the color compensation layer 106 so that the photoresist 118 could be lift off much more easily from the patterned transparent conductive layer 104 thereby improving the yield and efficiency of the process.

Figure 4:
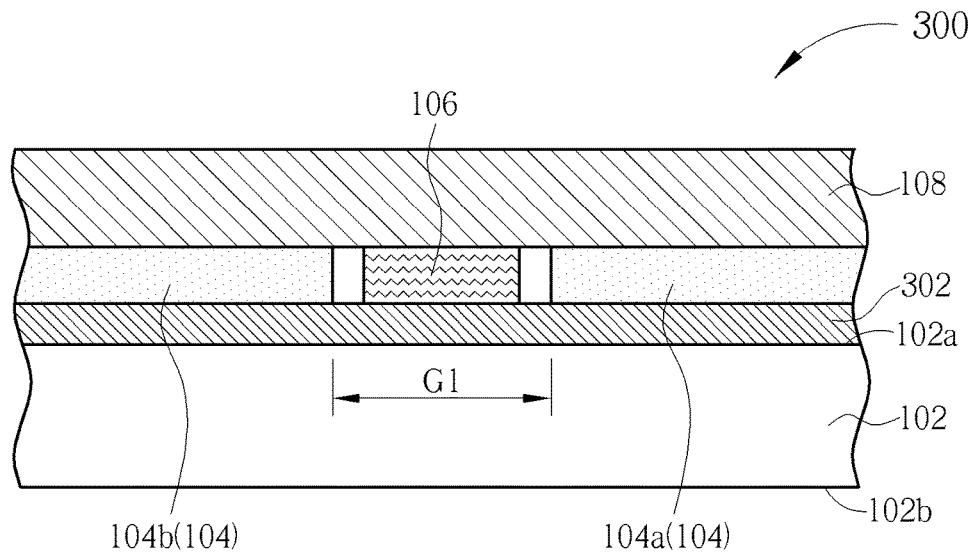
FIG. 4 illustrates a cross-sectional view of a touch panel according to a third embodiment of the present invention.

Referring to FIG. 4, FIG. 4 illustrates a cross-sectional view of a touch panel according to a third embodiment of the present invention. As shown in FIG. 4, as compared with the first embodiment, the touch panel 300 further includes an anti-reflective layer 302 disposed between the patterned transparent conductive layer 104 and the substrate 102 and also between the color compensation layer 106 and the substrate 102. This preferably improves the visual performance of the entire touch panel 300. It should be noted that the anti-reflective layer of this embodiment could also be applied to the touch panel of the aforementioned second embodiment, which is also within the scope of the present invention.

Figure 5:
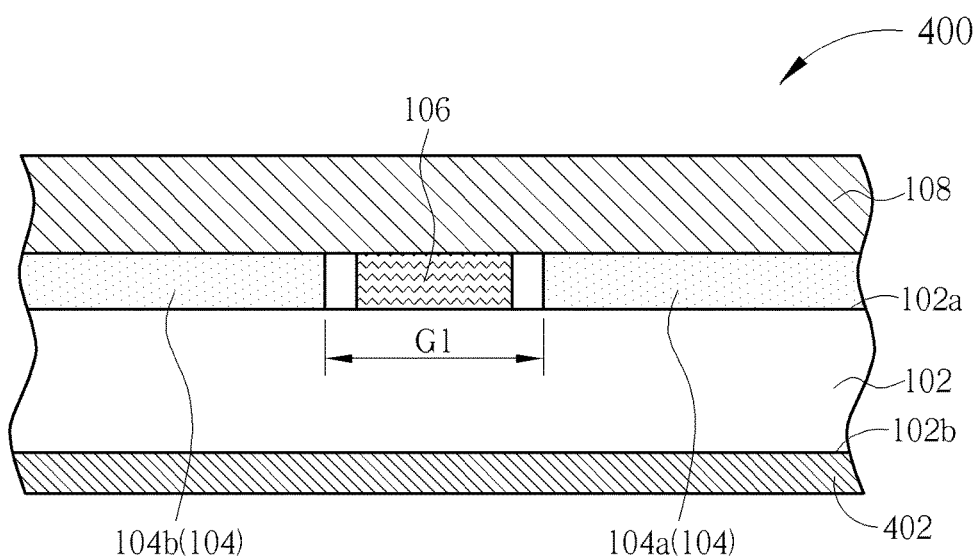
FIG. 5 illustrates a cross-sectional view of a touch panel according to a fourth embodiment of the present invention.

Referring to FIG. 5, FIG. 5 illustrates a cross-sectional view of a touch panel according to a fourth embodiment of the present invention. As shown in FIG. 5, as compared with the first embodiment, the touch panel 400 further includes an anti-reflective layer 402 disposed on the second surface 102b of the substrate 102 for improving the visual performance of the entire touch panel 400. It should be noted that the anti-reflective layer of this embodiment could also be applied to the touch panel of the second embodiment addressed previously, which is also within the scope of the present invention.

Figure 6:
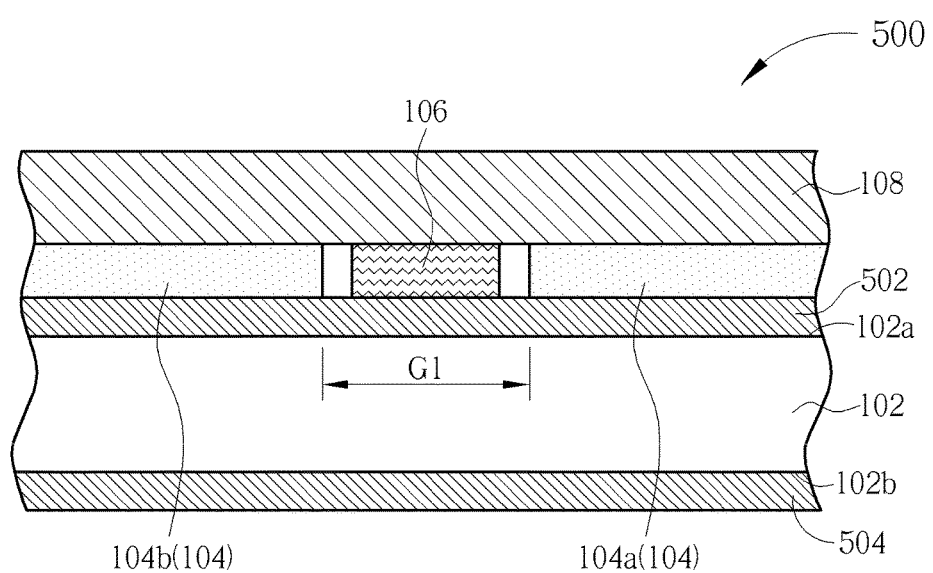
FIG. 6 illustrates a cross-sectional view of a touch panel according to a fifth embodiment of the present invention.

Referring to FIG. 6, FIG. 6 illustrates a cross-sectional view of a touch panel according to a fifth embodiment of the present invention. As shown in FIG. 6, as compared with the first embodiment, the touch panel 500 further includes a first anti-reflective layer 502 and a second anti-reflective layer 504, in which the first anti-reflective layer 502 is disposed between the patterned transparent conductive layer 104 and the substrate 102 and between the color compensation layer 106 and the substrate 102 while the second anti-reflective layer 504 is disposed on the second surface 102b of the substrate 102. Through the first anti-reflective layer 502 and the second anti-reflective layer 504, the visual performance of the touch panel 500 is improved substantially. It should be noted that the first anti-reflective layer and the second anti-reflective layer of this embodiment could also be applied to the touch panel of the second embodiment address previously, which is also within the scope of the present invention.

Figure 7:
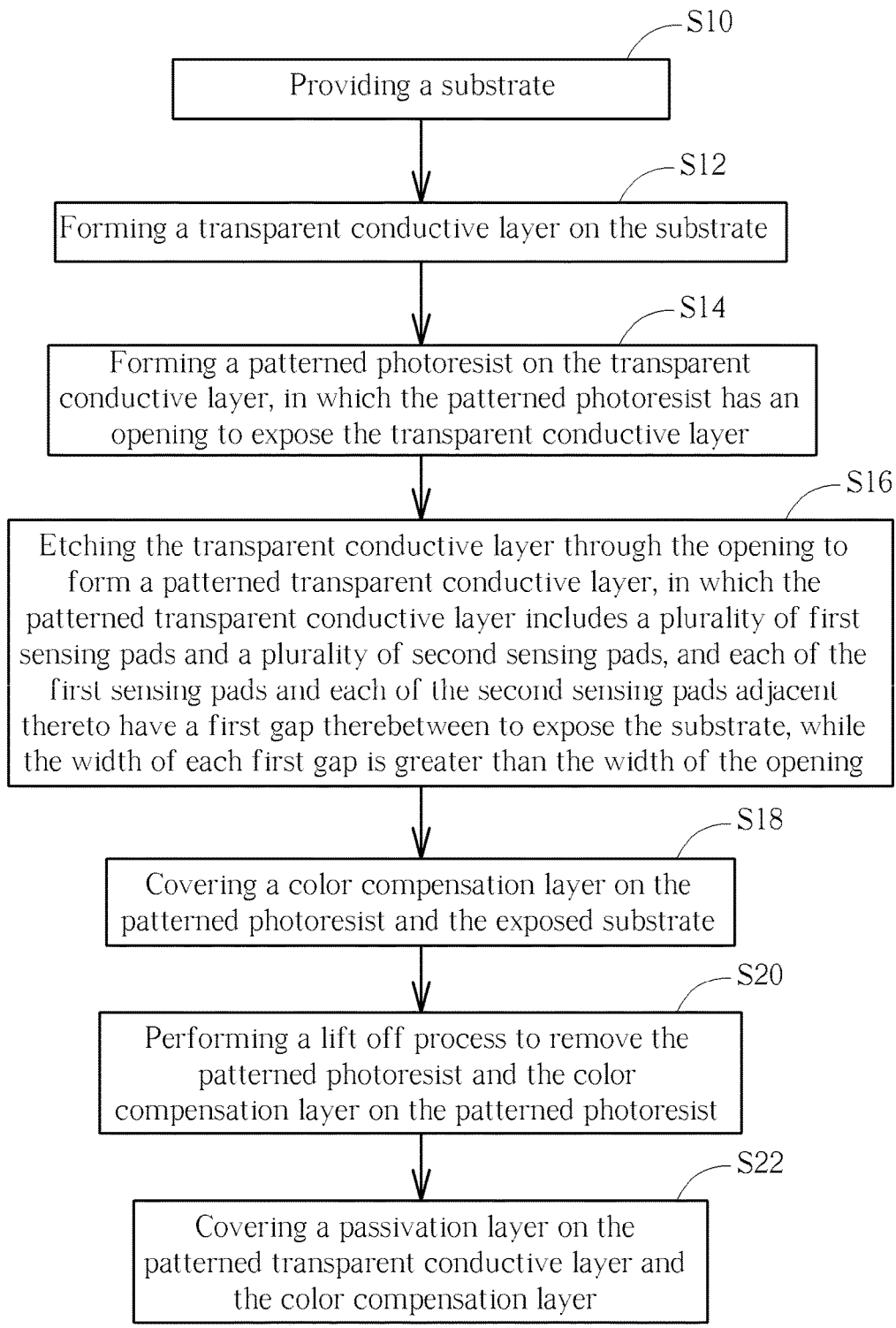
FIG. 7 is a flow chart diagram illustrating a manufacturing method of the touch panel according to the first embodiment of the present invention.

A manufacturing method of a touch panel in the present invention is described below. It should be noted that even though the aforementioned first embodiment is used as an example, the manufacturing method of the present invention is not limited thereto. Referring to FIGS. 7-11 and FIGS. 1-2 simultaneously, in which FIG. 7 illustrates a flow chart diagram of the manufacturing method of the touch panel according to the first embodiment of the present invention, and FIGS. 8-11 illustrate the manufacturing method of the touch panel in the first embodiment. As shown in FIG. 7, the manufacturing method of the touch panel includes following steps:

Step S10: providing a substrate 102;

Step S12: forming a transparent conductive layer 116 on the substrate 102;

Step S14: forming a patterned photoresist 118 on the transparent conductive layer 116, in which the patterned photoresist 118 has an opening 118a to expose the transparent conductive layer 116;

Step S16: etching the transparent conductive layer 116 through the opening 118a to form a patterned transparent conductive layer 104, in which the patterned transparent conductive layer 104 includes a plurality of first sensing pads 104a and a plurality of second sensing pads 104b, and each of the first sensing pads 104a and each of the second sensing pads 104b adjacent thereto have a first gap G1 therebetween to expose the substrate 102, while the width of each first gap G1 is greater than the width of the opening 118a;

Step S18: covering a color compensation layer 106 on the patterned photoresist 118 and the exposed substrate 102;

Step S20: performing a lift off process to remove the patterned photoresist 118 and the color compensation layer 106 on the patterned photoresist 118; and Step S22: covering a passivation layer 108 on the patterned transparent conductive layer 104 and the color compensation layer 106.

Figure 8:
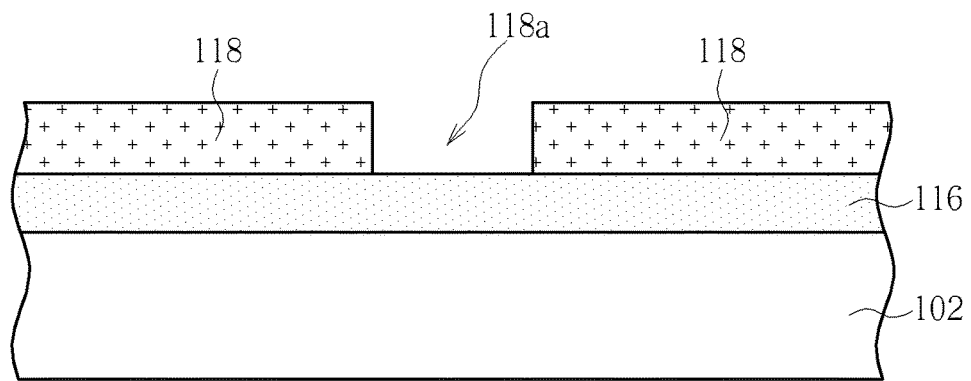
FIGS. 8-11 illustrate a manufacturing method of the touch panel according to the first embodiment of the present invention.

As shown in FIG. 8, the substrate 102, such as a glass substrate, a plastic substrate, or a quartz substrate as revealed in Step S10 could be first provided. Next, as shown in Step S12, the transparent conductive layer 116 could be formed on the substrate 102 through physical vapor deposition (PVD) processes such as evaporation or sputtering process. Next, as shown in Step S14, the patterned photoresist 118 could be formed on the transparent conductive layer 116 through photolithography process. For instance, photoresist material could be first coated onto the transparent conductive layer 116, and an exposure and development process could be carried out to transfer the pattern of the aforementioned patterned transparent conductive layer 104 onto the photoresist material to form the transparent conductive layer 118. It should be noted that in a variation of the present invention, an anti-reflective layer or other insulating layer could be formed on the first surface and/or second surface of the substrate before forming the transparent conductive layer, which is also within the scope of the present invention.

Figure 9:
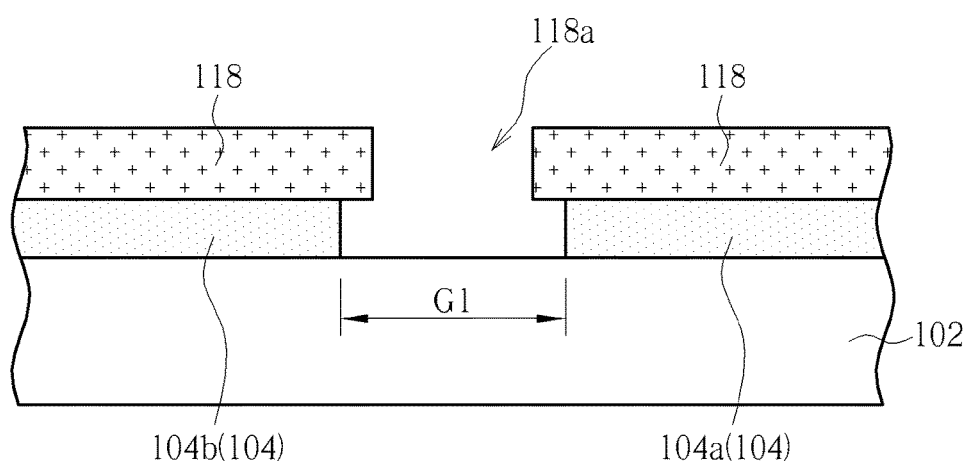

Next, as shown in FIG. 9, such as revealed in the Step S16, an etching process is performed to transfer the pattern of the patterned photoresist 118 to the transparent conductive layer 116 for forming the patterned transparent conductive layer 104. The patterned transparent conductive layer 104 preferably includes a plurality of first sensing pads 104a and a plurality of second sensing pads 104b, in which each of the first sensing pads 104a and each of the second sensing pads 104b adjacent thereto have a first gap G1 therebetween to expose the substrate 102, as shown in FIG. 1. It should be noted that the etching process of this embodiment preferably etches the transparent conductive layer 116 until forming an undercut so that the width of each of the first gap G1 of the patterned transparent conductive layer 104 is greater than the width of the opening 118a.

Figure 10:
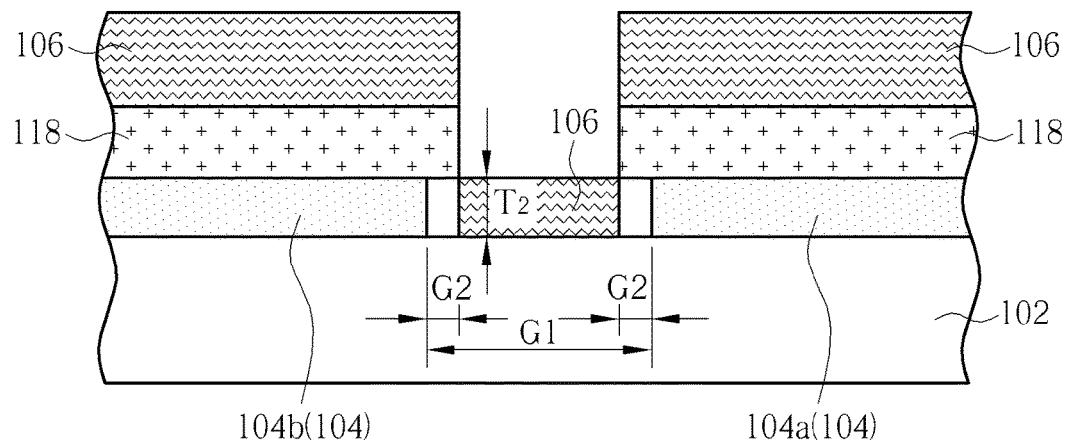

As shown in FIG. 10, such as revealed in the Step S18, the color compensation layer 106 could be formed on the patterned photoresist 118 through PVD process, such as an evaporation or sputtering process, in which a portion of the color compensation layer 106 is preferably deposited on the substrate 102 exposed through the opening 118a. It should be noted that through the utilization of PVD process, the second thickness T2 of the color compensation layer 106 could be controlled much more accurately than the conventional printing or spray process, so that the third color of the color compensation layer 106 can be effectively controlled to be the same as the second color of the patterned transparent conductive layer 104 or between the first color and the second color.

Figure 11:
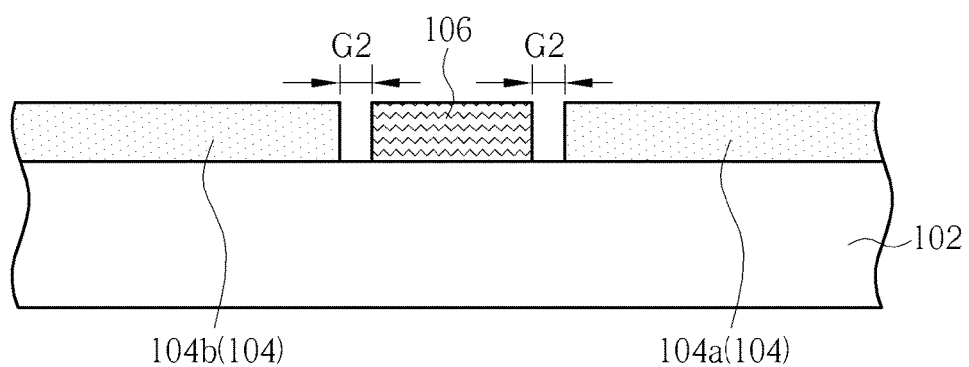

As shown in FIG. 11, such as revealed in the Step S20, a lift off process is carried out to remove the patterned photoresist 118. For instance, the patterned photoresist 118 could be placed into a solution used for dissolving the patterned photoresist 118 for stripping not only the patterned photoresist 118 but also the color compensation layer 106 on the patterned photoresist 118. By doing so, the portion of the color compensation layer 106 not on the patterned photoresist 118 and exposed by the opening 118a preferably remains between each of the first sensing pads 104a and each of the second sensing pads 104b on the substrate 102, in which the color compensation layer 106 and the opening 118a could have substantially same width. Since the width of each first gap G1 of the patterned transparent conductive layer 104 is greater than the width of the opening 118a, the color compensation layer 106 could be not contacting the patterned transparent conductive layer 104 and instead could have a second gap G2 between the patterned transparent conductive layer 104, in which the second gap G2 is preferably between 0.5 μm to 5 μm. In addition, since the color compensation layer 106 is not in contact with the patterned transparent conductive layer 104, the color compensation layer 106 could thus be composed of transparent conductive material. It should be noted that by using the lift off process to remove the patterned photoresist 118 and form the color compensation layer 106 on the substrate 102, the manufacturing method of the touch panel 100 of the present invention could reduce the cost of photomask and resist material substantially and also prevent the issue of poor precision caused during photolithography and etching processes. Also, as noted previously, if the second thickness T2 of the color compensation layer 106 is less than the first thickness T1 of the patterned transparent conductive layer 104 during the process of forming the color compensation layer 106, the photoresist 118 on the patterned transparent conductive layer 104 could be removed much more easily during the lift off process thereby increasing the yield and efficiency of the process.

As shown in FIG. 1 and FIG. 2, such as revealed in the Step S22, before forming a passivation layer 108, an insulating layer could be formed on the connecting parts 104c of the patterned transparent conductive layer 104, and the bridge electrodes 110 are formed on the insulating layer and the second sensing pads 104b thereafter. Last, a passivation layer 108 is formed on the patterned transparent conductive layer 104, the bridge electrodes 110, and the color compensation layer 106 for protecting the layers 104, 110, and 106.

Overall, by disposing a color compensation layer between each of the first sensing pads and each of the second sensing pads while the third color of the color compensation layer is between the first color of the substrate and the second color of the patterned transparent conductive layer, the color obtained after the light beam passing through the substrate and the color compensation layer could be substantially the same as the color obtained after the light beam passing through the substrate and the patterned transparent conductive layer, thereby compensating the light color passed through each of the first sensing pads and the second sensing pads. By doing so, viewers would not notice the pattern of the patterned transparent conductive layer thereby reducing the visual effect of the patterned transparent conductive layer to a minimal. Also, by forming the color compensation layer between each of the first sensing pads and each of the second sensing pads through the lift off process not only controls the position of the color compensation layer precisely but also reduces the cost substantially.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A manufacturing method of a touch panel, comprising:
    providing a substrate;
    forming a transparent conductive layer on the substrate;
    forming a patterned photoresist on the transparent conductive layer, wherein the patterned photoresist comprises an opening for exposing the transparent conductive layer;
    etching the transparent conductive layer through the opening to form a patterned transparent conductive layer, wherein the patterned transparent conductive layer comprises a plurality of first sensing pads and a plurality of second sensing pads, wherein each of the first sensing pads and each of the second sensing pads adjacent thereto have a first gap therebetween, etching the transparent conductive layer continuously etches the transparent conductive layer until a width of each of the first gaps is larger than a width of the opening, and a difference between the width of each of the first gaps and the width of the opening is between 1 μm to 10 μm;
    covering a color compensation layer on the patterned photoresist and the substrate exposed through the opening, wherein the color compensation layer and the patterned transparent conductive layer are formed in different steps, and the color compensation layer is formed after the patterned transparent conductive layer is formed; and
    performing a lift off process to remove the patterned photoresist and the color compensation layer on the patterned photoresist, and a portion of the color compensation layer not on the patterned photoresist and exposed by the opening remaining between each of the first sensing pads and each of the second sensing pads on the substrate, wherein the portion of the color compensation layer is not in contact with the patterned transparent conductive layer, the portion of the color compensation layer and the patterned transparent conductive layer comprise a second gap therebetween, the second gap is between 0.5 μm to 5 μm, and the difference is twice as large as the second gap.

2. The manufacturing method of the touch panel according to claim 1, wherein the substrate comprises a first color, the patterned transparent conductive layer comprises a second color, and the color compensation layer comprises a third color, wherein the third color is the same as the second color or between the first color and the second color.

3. The manufacturing method of the touch panel according to claim 1, wherein the color compensation layer and the transparent conductive layer comprise a same material.

4. The manufacturing method of the touch panel according to claim 1, wherein the color compensation layer comprises an insulating material.

5. The manufacturing method of the touch panel according to claim 1, wherein the patterned transparent conductive layer comprises a first thickness, and the color compensation layer comprises a second thickness equal to the first thickness.

6. The manufacturing method of the touch panel according to claim 1, wherein the patterned transparent conductive layer comprises a first thickness, and the color compensation layer comprises a second thickness less than the first thickness.

7. The manufacturing method of the touch panel according to claim 1, further comprising forming an anti-reflective layer on the substrate or under the substrate before forming the transparent conductive layer.

8. The manufacturing method of the touch panel according to claim 1, further comprising forming a first anti-reflective layer and a second anti-reflective layer respectively on the substrate and under the substrate before forming the transparent conductive layer.

9. The manufacturing method of the touch panel according to claim 1, wherein the patterned transparent conductive layer comprises a plurality of connecting parts, and the manufacturing method further comprises:
    forming an insulating layer on the connecting parts of the patterned transparent conductive layer after performing the lift off process; and
    forming a plurality of bridge electrodes on the insulating layer and the second sensing pads.

10. The manufacturing method of the touch panel according to claim 1, further comprising covering a passivation layer on the patterned transparent conductive layer and the color compensation layer.

11. The manufacturing method of the touch panel according to claim 1, wherein the step of covering the color compensation layer utilizes a physical vapor deposition process.

12. The manufacturing method of the touch panel according to claim 1, wherein the step of performing the lift off process comprises placing the patterned photoresist into a solution for dissolving the patterned photoresist.

* * * * *